United States Patent
Kukita

(10) Patent No.: US 9,481,305 B2
(45) Date of Patent: Nov. 1, 2016

(54) ANTI-GLARE MIRROR, VEHICLE, AND MANUFACTURING METHOD FOR ANTI-GLARE MIRROR

(71) Applicant: KABUSHIKI KAISHA HONDA LOCK, Miyazaki-shi, Miyazaki (JP)

(72) Inventor: Tomoyuki Kukita, Miyazaki (JP)

(73) Assignee: KABUSHIKI KAISHA HONDA LOCK, Miyazaki (JP)

( * ) Notice: Subject to any disclaimer, the term of this patent is extended or adjusted under 35 U.S.C. 154(b) by 154 days.

(21) Appl. No.: 14/384,083

(22) PCT Filed: Mar. 27, 2013

(86) PCT No.: PCT/JP2013/059020
§ 371 (c)(1),
(2) Date: Sep. 9, 2014

(87) PCT Pub. No.: WO2014/013759
PCT Pub. Date: Jan. 23, 2014

(65) Prior Publication Data
US 2015/0077828 A1 Mar. 19, 2015

(30) Foreign Application Priority Data
Jul. 17, 2012 (JP) ................. 2012-158330

(51) Int. Cl.
*G02F 1/153* (2006.01)
*G02B 5/08* (2006.01)
(Continued)

(52) U.S. Cl.
CPC ............... *B60R 1/088* (2013.01); *B60R 1/04* (2013.01); *G02F 1/155* (2013.01); *G02F 1/157* (2013.01);
(Continued)

(58) Field of Classification Search
CPC ........ G02F 1/157; G02F 1/155; G02F 1/161; G02F 1/153; G02F 1/15; G02F 1/163; G02F 1/1523; G02F 2001/1515; G02F 2203/02; G02F 2001/1555; G02F 2001/1502; G02F 1/01; G02F 2001/1512; G02F 2201/34; G02F 1/133553; G09G 3/38

USPC ................. 359/267, 268, 273, 274, 603–608
See application file for complete search history.

(56) References Cited

U.S. PATENT DOCUMENTS 4,824,221 A * 4/1989 Endo ..................... G02F 1/1533
359/267
5,640,274 A * 6/1997 Iwama .................... B60R 1/088
359/265
(Continued)

FOREIGN PATENT DOCUMENTS

DE 19640515 A1 4/1998
EP 0 705 734 4/1996
(Continued)

OTHER PUBLICATIONS

International Search Report dated Jun. 25, 2013, Application No. PCT/JP2013/059020, English Translation included.
(Continued)

*Primary Examiner* — Evelyn A Lester
(74) *Attorney, Agent, or Firm* — Rankin, Hill & Clark LLP

(57) ABSTRACT

The size of an anti-glare mirror in which an electrochromic layer to which voltage can be applied is disposed on a back surface side of a glass substrate serving as a mirror surface can be reduced, and the mirror surface thereof can be used widely.

[Solution] A transparent electrode film 19 and an electrochromic layer 20 having a cut portion 25A for exposing a part of the transparent electrode film 19 are sequentially stacked on a back surface of a glass substrate 18, an electrode/reflecting film 21A is stacked on a back surface of the electrochromic layer 20 in an area excluding the cut portion 25A, a first terminal 28 is electrically connected to the electrode/reflecting film 21A, and a second terminal 29 is electrically connected to the transparent electrode 19 within the cut portion 25A.

13 Claims, 5 Drawing Sheets

(51) Int. Cl.

| | |
|---|---|
| *B60R 1/08* | (2006.01) |
| *B60R 1/04* | (2006.01) |
| *G02F 1/157* | (2006.01) |
| *G02F 1/15* | (2006.01) |
| *G02F 1/01* | (2006.01) |
| *G02F 1/1335* | (2006.01) |
| *G02F 1/155* | (2006.01) |
| *G02F 1/161* | (2006.01) |
| *G02F 1/163* | (2006.01) |
| *G09G 3/38* | (2006.01) |
| *G02F 1/19* | (2006.01) |

(52) U.S. Cl.
CPC ........... *G02F 1/01* (2013.01); *G02F 1/133553* (2013.01); *G02F 1/15* (2013.01); *G02F 1/153* (2013.01); *G02F 1/1523* (2013.01); *G02F 1/161* (2013.01); *G02F 1/163* (2013.01); *G02F 1/19* (2013.01); *G02F 2001/1502* (2013.01); *G02F 2001/1512* (2013.01); *G02F 2001/1515* (2013.01); *G02F 2001/1555* (2013.01); *G02F 2201/34* (2013.01); *G02F 2203/02* (2013.01); *G09G 3/38* (2013.01); *Y10T 29/49208* (2015.01)

(56) References Cited

U.S. PATENT DOCUMENTS

| | | | |
|---|---|---|---|
| 6,768,574 B2* | 7/2004 | Bertran | B60R 1/088 359/265 |
| 7,391,549 B2* | 6/2008 | Kukita | B60R 1/088 359/267 |
| 2003/0156313 A1 | 8/2003 | Viera Marmol | |
| 2011/0261430 A1* | 10/2011 | Mazurkiewicz | G02F 1/15 359/273 |

FOREIGN PATENT DOCUMENTS

| | | |
|---|---|---|
| EP | 1369740 A1 | 12/2003 |
| JP | 50-123716 | 9/1975 |
| JP | 63-198027 | 12/1988 |
| JP | 04-059455 | 2/1992 |
| JP | 08-106110 | 4/1996 |
| JP | 08-282374 | 10/1996 |
| JP | 2007-101947 | 4/2007 |
| JP | 2012-133027 | 7/2012 |

OTHER PUBLICATIONS

Extended European Search Report issued on Feb. 19, 2016 for the corresponding European Patent Application No. 13819880.9.

* cited by examiner

ANTI-GLARE MIRROR, VEHICLE, AND MANUFACTURING METHOD FOR ANTI-GLARE MIRROR

TECHNICAL FIELD

The present invention relates to an anti-glare mirror in which an electrochromic layer to which voltage can be applied is disposed on a back surface side of a glass substrate serving as a mirror surface, a vehicle in which the anti-glare mirror is used, and an improvement of a manufacturing method for the anti-glare mirror.

BACKGROUND ART

Patent Literature 1 discloses a transparent electrode film, an electrochromic layer, and an electrode/reflecting film are sequentially stacked on a back surface of a glass substrate. In this disclosure, a clip electrode connected to the transparent electrode film and a clip electrode connected to the electrode/reflecting film are provided at upper and lower edge portions of the glass substrate. These clip electrodes are covered with a housing.

CITATION LIST

Patent Literature

PATENT LITERATURE 1: JP 8-282374 A

SUMMARY OF INVENTION

Problems to be Solved by the Invention

In the disclosure of Patent Literature 1, however, a portion provided with the clip electrodes or a peripheral portion of the glass substrate cannot be used as the anti-glare mirror and the usable mirror surface is limited. Moreover, the clip electrodes protrude outward from the outer edge of the mirror substrate, forcing an increase in size of the entire anti-glare mirror device including the housing.

The present invention has been made in view of the above circumstances. An object of the present invention is to provide an anti-glare mirror having a mirror surface that can be used widely and can be reduced in size, and a vehicle in which the anti-glare mirror is used. Another object of the present invention is to provide a manufacturing method for an anti-glare mirror, which can easily manufacture the anti-glare mirror having a mirror surface that can be used widely and can be reduced in size.

Solutions to the Problems

To obtain the above object, a first feature of the present invention is that, in an anti-glare mirror, an electrochromic layer to which voltage can be applied is disposed on a back surface side of a glass substrate serving as a mirror surface; a transparent electrode film and the electrochromic layer provided with cut portions for exposing a part of the transparent electrode film are sequentially stacked on the back surface of the glass substrate; an electrode/reflecting film is stacked on a back surface of the electrochromic layer in an area excluding the cut portions; a first terminal is electrically connected to the electrode/reflecting film; and a second terminal is electrically connected to the transparent electrode film within the cut portions.

Moreover, a second feature of the present invention in addition to a configuration of the first feature is that the electrode/reflecting film is stacked on the back surface of the electrochromic layer as a first electrode/reflecting film; a second electrode/reflecting film isolated from the first electrode/reflecting film is stacked on a back surface of the transparent electrode film within the cut portions; and the second terminal is electrically connected to the transparent electrode film through the second electrode/reflecting film.

A third feature of the present invention in addition to a configuration of the second feature is that each of the first and second electrode/reflecting films is a half mirror that reflects light from the glass substrate side; and a light detection sensor is disposed in the cut portion on a back surface side of the second electrode/reflecting film.

A fourth feature of the present invention is that in a vehicle in which the anti-glare mirror according to any of the first to third features is used, the anti-glare mirror is used as a rear-view mirror.

A fifth feature of the present invention is that in a vehicle in which the anti-glare mirror according to any of the first to third features is used, the anti-glare mirrors are used as side-view mirrors.

A sixth feature of the present invention in addition to a configuration of the fifth feature is that the cut portions are disposed at an end of the anti-glare mirrors on an inner side in a vehicle width direction.

Furthermore, the seventh feature of the present invention is that a manufacturing method for an anti-glare mirror for manufacturing the anti-glare mirror according to the second feature includes sequentially performing: a first step in which the transparent electrode film is formed on the back surface of the glass substrate; a second step in which the electrochromic layer is formed in the area excluding the portion that is covered with the anti-tack member covering a portion corresponding to the cut portions on the back surface of the transparent electrode film in the state that the anti-tack member is fixed to the glass substrate and the transparent electrode film; a third step in which a preformed film that can be the first and second electrode/reflecting films is formed on the back surface of the electrochromic layer, a side surface of the electrochromic layer corresponding to the cut portions, and on the back surface of the transparent electrode film in the state that the anti-tack member is removed; a fourth step in which the cut portions are formed by performing a laser-etching process on a portion of the preformed film formed in the third step that becomes outer edges of the cut portions, and the preformed film is separated into the first and second electrode/reflecting films that are isolated from each other; and a fifth step in which the first terminal is electrically connected to the first electrode/reflecting film, and the second terminal is electrically connected to the second electrode/reflecting film.

Effects of the Invention

According to the first feature of the present invention, the cut portion for exposing a part of the transparent electrode having the electrochromic layer interposed between the transparent electrode and the electrode/reflecting film is provided for the electrochromic layer. Moreover, the first terminal is electrically connected to the electrode/reflecting film, and in the cut portion, the second terminal is electrically connected to the transparent electrode film. Thus, the portion that cannot be used as the anti-glare mirror is as small as the area corresponding to the cut portion. This enables the mirror surface to be used widely. Moreover, since the first terminal and the second terminal do not protrude sideward from the mirror surface, the size reduction becomes possible.

According to the second feature of the present invention, the second terminal is electrically connected to the transparent electrode film through the second electrode/reflecting film that is stacked on the transparent electrode layer in the cut portion in a manner that the second electrode/reflecting film is isolated from the first electrode/reflecting film stacked on the electrochromic layer. This prevents that the provision of the cut portion makes the components behind the glass substrate visible.

According to the third feature of the present invention, the light entering through the glass substrate, the transparent electrode, and the second electrode/reflecting film serving as a half mirror is detected by the light detection sensor in the cut portion. This can eliminate the necessity of securing the space for disposing the light detection sensor the anti-glare mirror, whereby the size of the components including the light detection sensor can be reduced.

According to the fourth feature of the present invention, the size of the rear-view mirror formed by the anti-glare mirror can be reduced while the wide mirror surface of the rear-view mirror is secured.

According to the fifth feature of the present invention, the size of the side-view mirror formed by the anti-glare mirror can be reduced while the wide mirror surface of the side-view mirror is secured.

According to the sixth feature of the present invention, the end of the side-view mirror on the inner side in the vehicle width direction reflects the own vehicle and does not need to have the anti-glare function. Therefore, by disposing the cut portion at that position, the position of the portion to be used as the anti-glare mirror can be disposed efficiently.

According to the seventh feature of the present invention, the preformed film that can serve as the first and second electrode/reflecting films is formed on the back surface of the electrochromic layer, the side surface of the electrochromic layer corresponding to the cut portion, and the back surface of the transparent electrode film. After that, by performing a laser-etching process on the part of the preformed film that is to be an outer edge of the cut portion, the cut portion is formed and at the same time, the preformed film is separated into the first and second electrode/reflecting films that are isolated from each other. Thus, the cut portion and the first and second electrode/reflecting films can be formed easily and efficiently.

BRIEF DESCRIPTION OF THE DRAWINGS

FIG. 5(*a*) is a diagram illustrating a first step;
FIG. 5(*b*) is a diagram illustrating a second step;
FIG. 5(*c*) is a diagram illustrating a third step;
FIG. 5(*d*) is a diagram illustrating a fourth step;
FIG. 5(*e*) is a diagram illustrating a fifth step; and
FIG. 5(*f*) is a diagram illustrating a sixth step.

DESCRIPTION OF EMBODIMENTS

An embodiment of the present invention is hereinafter described with reference to the attached drawings.

Figure 1:
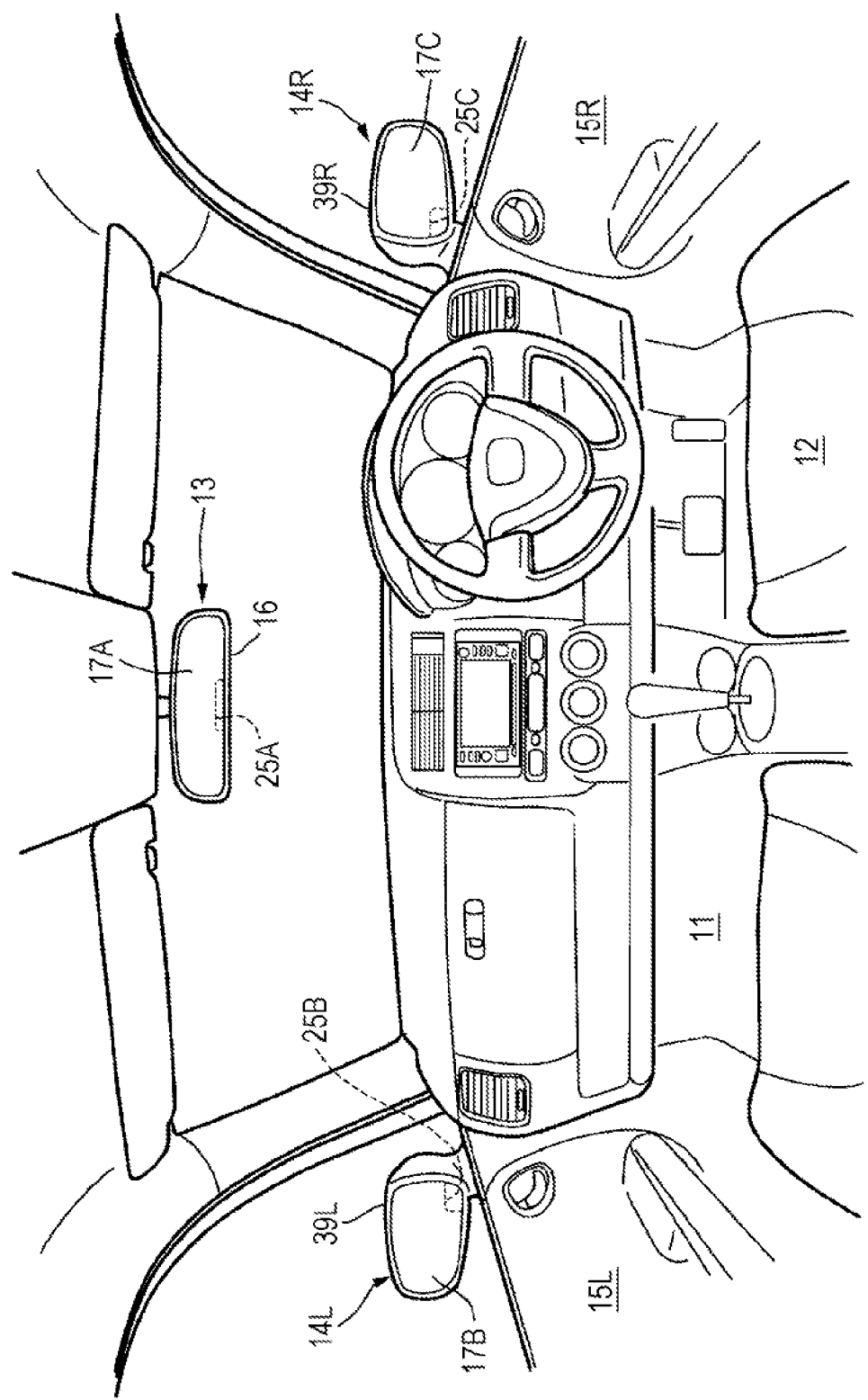
FIG. 1 is a diagram illustrating a first embodiment, in which a front portion of a car interior is viewed from behind.

A first embodiment of the present invention is described with reference to FIG. 1 to FIG. 5. In FIG. 1, first, a driver's seat 12 is disposed on, for example, the right side of the front portion in a car interior 11 of an automobile. For allowing a driver sitting on the driver's seat 12 to obtain the view behind the vehicle, a rear-view mirror 13 is disposed in the upper part of the front portion in the car interior 11. Side-view mirrors 14L and 14R are disposed on the front portion of the vehicle outside front side doors 15L and 15R on the left and right sides of the vehicle.

Figure 2:
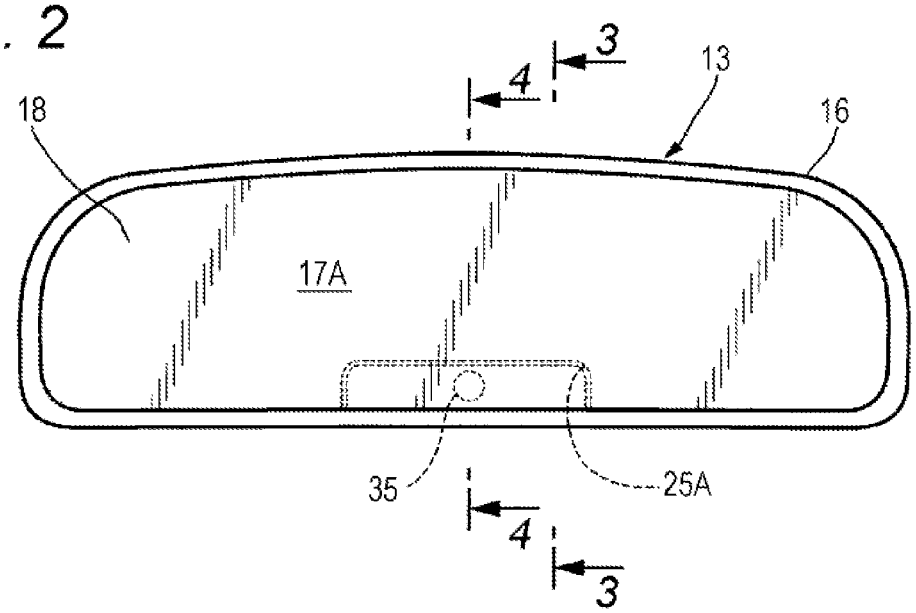
FIG. 2 is an enlarged view of a rear-view mirror.
Figure 3:
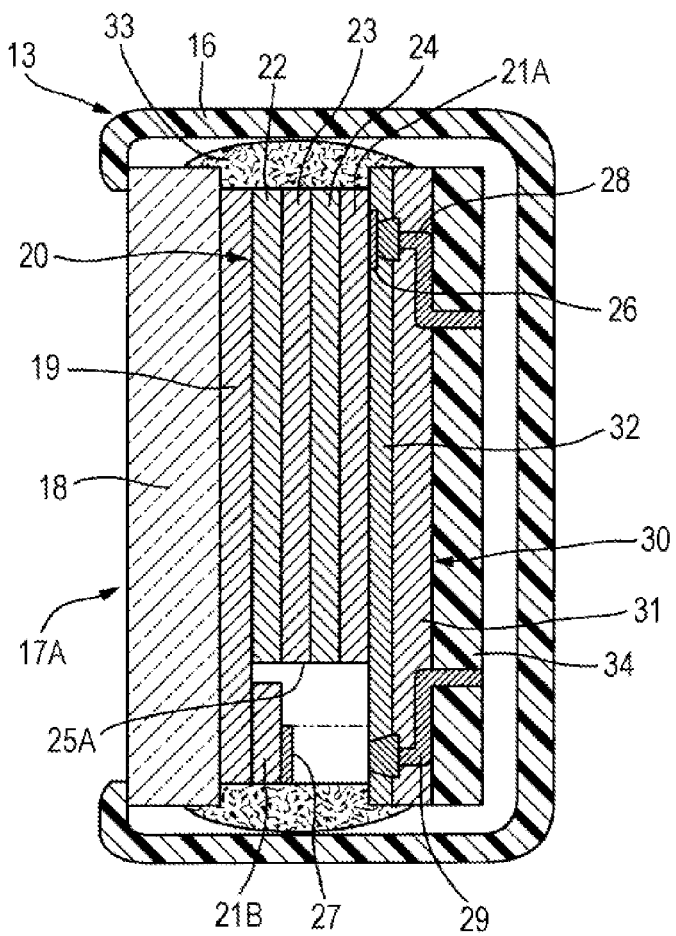
FIG. 3 is a cross-sectional view taken along a line 3-3 of FIG. 2.
Figure 4:
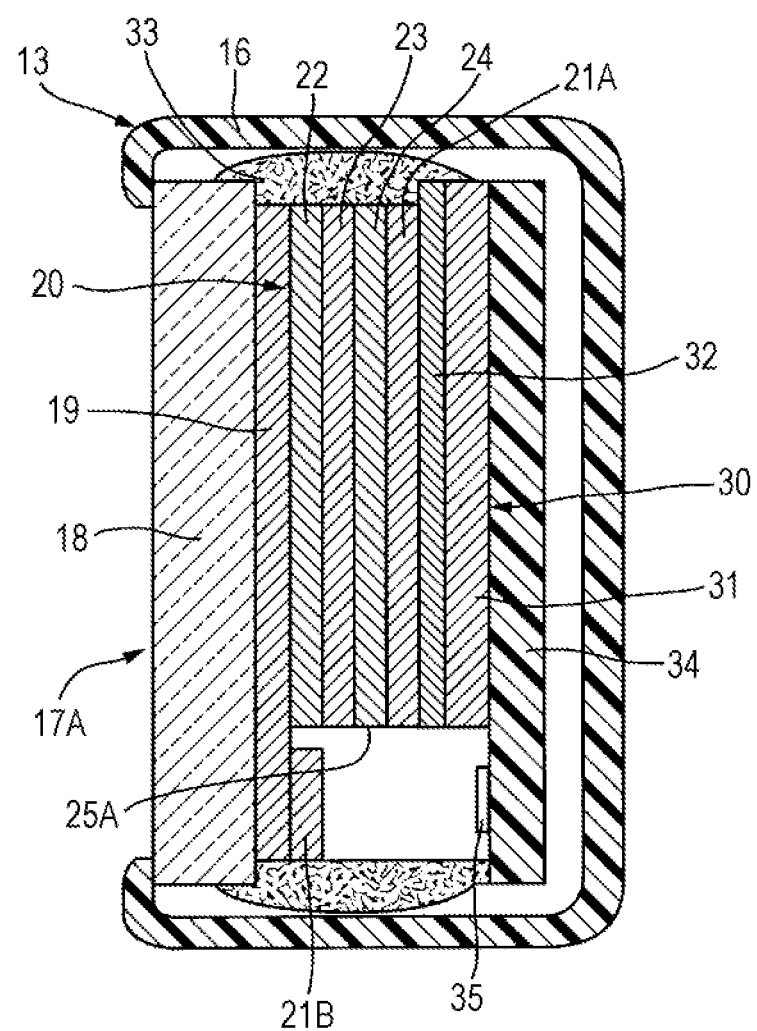
FIG. 4 is a cross-sectional view taken along a line 4-4 of FIG. 2.
Figure 5:
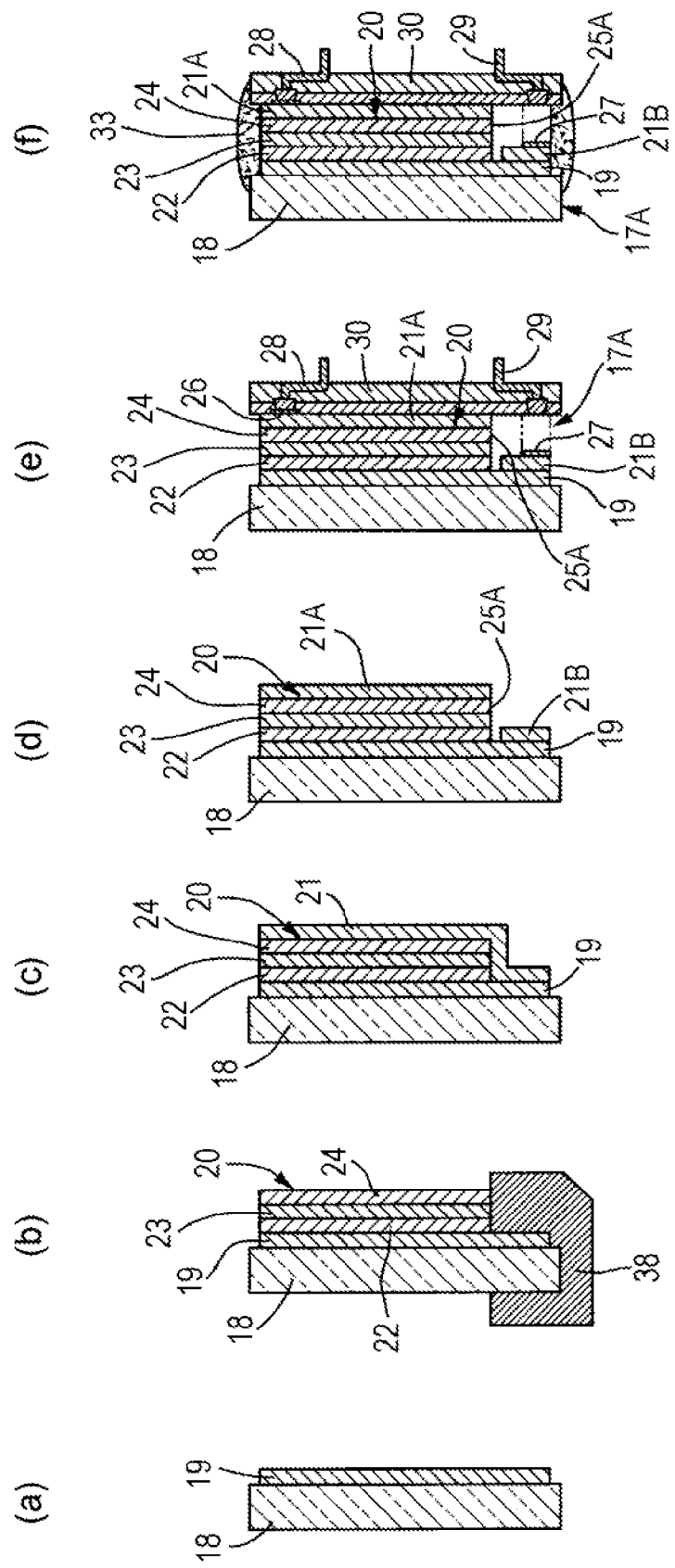
FIGS. 5(*a*) to 5(*f*) are diagrams sequentially illustrating a manufacturing process for an anti-glare mirror.

In FIG. 2 to FIG. 4, the rear-view mirror 13 is formed by disposing an anti-glare mirror 17A in the housing 16 so as to cover an opening of a housing 16, the housing being formed in the bowl-like shape opening backward and supported by the car body. The reflectance of this anti-glare mirror 17A can be changed by applying a voltage to an electrochromic layer 20 disposed on the back surface side of a glass substrate 18 serving as a mirror surface.

The anti-glare mirror 17A is structured as below. On the back surface of the glass substrate 18, a transparent electrode film 19 and the electrochromic layer 20 having a cut portion 25A for exposing a part of the transparent electrode film 19 are sequentially stacked. In an area excluding the cut portion 25A, a first terminal 28 is electrically connected to a first electrode/reflecting film 21A stacked on the back surface of the electrochromic layer 20. Within the cut portion 25A, a second terminal 29 is electrically connected to the transparent electrode film 19. In this embodiment, the second terminal 29 is isolated from the first electrode/reflecting film 21A. The second terminal 29 is electrically connected to the transparent electrode film 19 through a second electrode/reflecting film 21B stacked on the transparent electrode film 19 within the cut portion 25A.

The transparent electrode film 19 is formed of, for example, indium tin oxide. The electrochromic layer 20 is formed by stacking, for example, a nickel oxide layer 22, a tantalum pentoxide layer 23, and a tungsten oxide layer 24 in the order from the transparent electrode film 19 side. The first and second electrode/reflecting films 21A and 21B are formed of, for example, aluminum. Each of the first and second electrode/reflecting films 21A and 21B is a half mirror that reflects light entering from the glass substrate 18 side.

In the first embodiment, the cut portion 25A is formed at a lower portion in the center of the electrochromic layer 20 in the width direction so as to expose the center of a lower portion of the transparent electrode film 19 in the width direction.

The first terminal 28 is connected to the first electrode/reflecting film 21A through a conductive adhesive 26. Within the cut portion 25A, the second terminal 29 is connected to the second electrode/reflecting film 21B through a conductive adhesive 27.

The anti-glare mirror 17A includes a resin panel 30. This resin panel 30 includes the first and second terminals 28 and 29, and is attached to the back surface of the first electrode/reflecting film 21A. This resin panel 30 includes a panel main portion 31 including polyethylene, for example, and a film-like cover portion 32 that covers one surface of the panel main portion 31. The cover portion 32 includes, for example, polyethylene terephthalate-acrylate. The cover portion 32 covers one surface of the panel main portion 31 so as to embed an edge portion of each of the first and second terminals 28 and 29 eyeleted and caulked on one surface of the panel main portion 31.

Incidentally, in FIG. 3 and FIG. 4, the thicknesses of the transparent electrode film 19, the electrochromic layer 20, and the first and second electrode/reflecting films 21A and 21B are exaggerated for purposes of illustration. In FIG. 3, furthermore, there is a wide space between the second terminal 29 and the second electrode/reflecting film 21B. However, the actual electrochromic layer 20 has an extremely small thickness of 1 mm or less. In fact, the second terminal 29 and the second electrode/reflecting film 21B are electrically connected to each other through the thin conductive adhesive 27 as shown by a chain line in FIG. 3.

In the anti-glare mirror 17A, the transparent electrode film 19, the electrochromic layer 20, and the first electrode/reflecting film 21A are stacked on the back surface of the glass substrate 18. Moreover, the second electrode/reflecting film 21B is stacked on the transparent electrode film 19 and the resin panel 30 is attached to the first electrode/reflecting film 21A within the cut portion 25A. The outer periphery of the anti-glare mirror 17A in this state is provided with a coating layer 33 formed by curing, for example, an epoxy resin. This mutually binds the glass substrate 18, the transparent electrode film 19, the electrochromic layer 20, the first and second electrode/reflecting films 21A and 21B, and the resin panel 30.

The back surface of the resin panel 30 is provided with a substrate 34 to which the first and second terminals 28 and 29 are inserted. This substrate 34 is provided with a light detection sensor 35 for detecting the amount of light, which serves as a reference for changing the reflectance of the anti-glare mirror 17A. This light detection sensor 35 is, for example, a photodiode.

In FIG. 4, the resin panel 30 is formed to have a shape that does not cover the cut portion 25A. The light detection sensor 35 is disposed on the substrate 34 so as to come in the cut portion 25A on the back surface side of the second electrode/reflecting film 21B.

A manufacturing method for the anti-glare mirror 17A is described with reference to FIGS. 5(a) to 5(f). In a first step, as illustrated in FIG. 5(a), the transparent electrode film 19 is formed on the back surface of the glass substrate 18. Next, in a second step, as illustrated in FIG. 5(b), the electrochromic layer 20 is formed in a portion of the back surface of the transparent electrode film 19 excluding a portion covered with a clip-like anti-tack member 38 covering a portion corresponding to the cut portion 25A in a state that the anti-tack member 38 is fixed to the glass substrate 18 and the transparent electrode film 19.

In a third step, as illustrated in FIG. 5(c), in a state that the anti-tack member 38 is removed, a preformed film 21 is formed on the back surface of the electrochromic layer 20, the side surface of the electrochromic layer 20 corresponding to the cut portion 25A, and the back surface of the transparent electrode film 19. This preformed film 21 can serve as the first and second electrode/reflecting films 21A and 21B. In a fourth step, as illustrated in FIG. 5(d), a laser-etching process is performed on a portion of the preformed film 21 formed in the third step that becomes the outer edge of the cut portion 25A. Thus, the cut portion 25A is formed and moreover the preformed film 21 is separated into the first and second electrode/reflecting films 21A and 21B that are isolated from each other. Next, in a fifth step, as illustrated in FIG. 5(e), the resin panel 30 is attached to the back surface of the first electrode/reflecting film 21A so that the first terminal 28 is electrically connected to the first electrode/reflecting film 21A through the conductive adhesive 26 and the second terminal 29 is electrically connected to the second electrode/reflecting film 21B through the conductive adhesive 27. Thus, the anti-glare mirror 17A is obtained. Next, in a sixth step, as illustrated in FIG. 5(f), the coating layer 33 is formed by applying the epoxy resin on the outer periphery of the anti-glare mirror 17A. This mutually binds the glass substrate 18, the transparent electrode film 19, the electrochromic layer 20, the first and second electrode/reflecting films 21A and 21B, and the resin panel 30.

Paying attention to FIG. 1, the side-view mirrors 14L and 14R, which are disposed on the front portion of the vehicle outside the front side doors 15L and 15R on the left and right sides of the vehicle, are formed by disposing anti-glare mirrors 17B and 17C in housings 39L and 39R so as to cover the openings of the housings 39L and 39R, the housings 39L and 39R being formed in bowl-like shape opening backward and supported by the car body. The anti-glare mirrors 17B and 17C are basically formed in a manner similar to the anti-glare mirror 17A of the rear-view mirror 13. However, cut portions 25B and 25C are disposed at the end of the anti-glare mirrors 17B and 17C on the inner side in the vehicle width direction.

Next, the operation of the first embodiment is described. In the anti-glare mirrors 17A to 17C, the transparent electrode film 19 and the electrochromic layer 20 having the cut portions 25A to 25C for exposing a part of the transparent electrode film 19 are sequentially stacked on the back surface of the glass substrate 18. The anti-glare mirrors 17A to 17C are structured as below. The first electrode/reflecting film 21A is stacked on the back surface of the electrochromic layer 20 in the area excluding the cut portions 25A to 25C. The first terminal 28 is electrically connected to the first electrode/reflecting film 21A. The second terminal 29 is electrically connected to the transparent electrode film 19 within the cut portions 25A to 25C. Thus, the area that cannot be used as the anti-glare mirrors 17A to 17C is just as small as the area corresponding to cut portions 25A to 25C. This enables the use of the wide mirror surface. Moreover, since the first and second terminals 28 and 29 do not protrude sideward from the mirror surface, the size reduction is possible.

Moreover, the second electrode/reflecting film 21B isolated from the first electrode/reflecting film 21A is stacked on the back surface of the transparent electrode film 19 within the cut portions 25A to 25C. The second terminal 29 is connected to the second electrode/reflecting film 21B within the cut portions 25A to 25C. Thus, it is possible to avoid that the provision of the cut portions 25A to 25C makes the components behind the glass substrate 18 visible.

The light detection sensor 35 is disposed in the cut portions 25A to 25C on the back surface side of the second electrode/reflecting film 21B serving as a half mirror. Thus, the light entering through the glass substrate 18, the transparent electrode 19, and the second electrode/reflecting film 21B is detected by the light detection sensor 35 in the cut portions 25A to 25C. This eliminates the necessity of securing the space for disposing the light detection sensor 35 around the anti-glare mirrors 17A to 17C, whereby the size of the components including the light detection sensor 35 can be reduced.

Moreover, the anti-glare mirror 17A is used as the rear-view mirror 13. Therefore, the size reduction of the rear-view mirror 13 can be achieved while the mirror surface of the rear-view mirror 13 is widely secured. The anti-glare mirrors 17B and 17C are used as the side-view mirrors 14L and 14R. Therefore, the size reduction of the side-view mirrors 14L and 14R can be achieved while the mirror surface of the side-view mirrors 14L and 14R is widely secured.

Incidentally, the ends of the side-view mirrors 14L and 14R on the inner side in the vehicle width direction are the portions where the own vehicle is reflected and do not need to have the anti-glare function. The cut portions 25B and 25C are disposed on the ends of the anti-glare mirrors 17B and 17C used as the side-view mirrors 14L and 14R on the inner side in the vehicle width direction. Therefore, the positions to be used as the anti-glare mirrors 17B and 17C can be efficiently set.

For manufacturing the anti-glare mirrors 17A to 17C, the following steps are performed sequentially: a first step in which the transparent electrode film 19 is formed on the back surface of the glass substrate 18; a second step in which the electrochromic layer 20 is formed in the area excluding the portion that is covered with the anti-tack member 38 on the back surface of the transparent electrode film 19 in the state that the anti-tack member 38 covering the portion corresponding to the cut portions 25A to 25C is fixed to the glass substrate 18 and the transparent electrode film 19; a third step in which the preformed film 21 that can be the first and second electrode/reflecting films 21A and 21B is formed on the back surface of the electrochromic layer 20, the side surface of the electrochromic layer 20 corresponding to the cut portions 25A to 25C, and the back surface of the transparent electrode film 19 in the state that the anti-tack member 38 is removed; a fourth step in which the cut portions 25A to 25C are formed by performing the laser-etching process on the portion of the preformed film 21 formed in the third step that becomes the outer edges of the cut portions 25A to 25C, and the preformed film 21 is separated into the first and second electrode/reflecting films 21A and 21B that are isolated from each other; and a fifth step in which the first terminal 28 is electrically connected to the first electrode/reflecting film 21A and electrically connecting the second terminal 29 to the second electrode/reflecting film 21B. Thus, the cut portions 25A to 25C and the first and second electrode/reflecting films 21A and 21B can be formed easily and efficiently.

Figure 6:
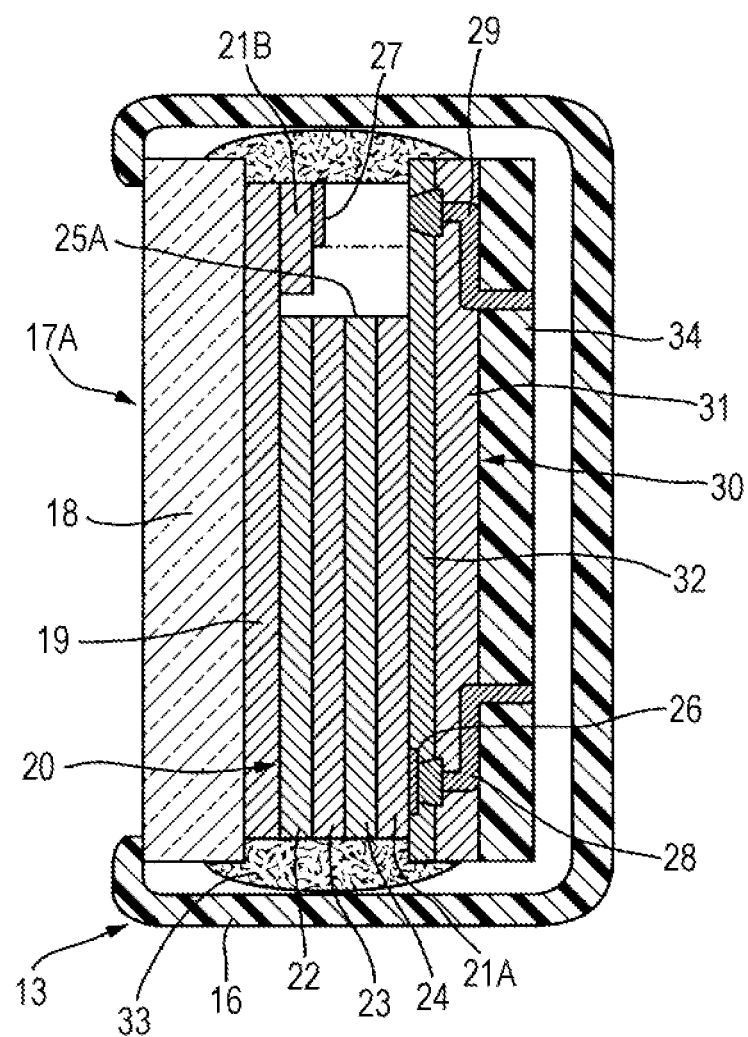
FIG. 6 is a cross-sectional view of a second embodiment corresponding to FIG. 3.

As a second embodiment of the present invention, as illustrated in FIG. 6, the cut portion 25A of the anti-glare mirror 17A used as the rear-view mirror 13 may be provided in an upper portion in the center of the electrochromic layer 20 in the width direction so as to expose the center of an upper portion of the transparent electrode film 19 in the width direction.

The embodiments of the present invention have been described as above. The present invention is, however, not limited thereto and various design changes can be made without departing from the present invention described in the scope of claims.

DESCRIPTION OF REFERENCE SIGNS

13 Rear-view mirror
14L, 14R Side-view mirror
17A, 17B, 17C Anti-glare mirror
18 Glass substrate
19 Transparent electrode film
20 Electrochromic layer
21 Preformed film
21A First electrode/reflecting film
21B Second electrode/reflecting film
25A, 25B, 25C Cut portion
35 Light detection sensor
38 Anti-tack member

The invention claimed is:

1. An anti-glare mirror comprising:
   a glass substrate serving as a mirror surface;
   an electrochromic layer to which voltage can be applied, the electrochromic layer having a transparent electrode film and a cut portion for exposing a part of the transparent electrode film disposed in this order on the back surface side of the glass substrate;
   a first electrode/reflecting film stacked on a back surface of the electrochromic layer in an area excluding the cut portion;
   a first terminal electrically connected to the first electrode/reflecting film; and
   a second terminal electrically connected to the transparent electrode film within the cut portion; and
   a second electrode/reflecting film isolated from the first electrode/reflecting film stacked on a back surface of the transparent electrode film within the cut portion,
   wherein the second terminal is electrically connected to the transparent electrode film through the second electrode/reflecting film.

2. The anti-glare mirror according to claim 1, further comprising:
   a light detection sensor disposed in the cut portion on a back surface side of the second electrode/reflecting film,
   wherein each of the first and second electrode/reflecting films is a half mirror that reflects light from the glass substrate side.

3. A vehicle comprising the anti-glare mirror according to claim 2 as a rear-view mirror.

4. A vehicle comprising the anti-glare mirror according to claim 2 as a side-view mirror.

5. The vehicle according to claim 4, wherein the cut portion is disposed at an end of the anti-glare mirror on an inner side in a vehicle width direction.

6. The anti-glare mirror according to claim 1, on the outer periphery of which a coating layer formed by curing resin is provided.

7. A vehicle comprising the anti-glare mirror according to claim 6 as a rear-view mirror.

8. A vehicle comprising the anti-glare mirror according to claim 6 as a side-view mirror.

9. The vehicle according to claim 8, wherein the cut portion is disposed at an end of the anti-glare mirror on an inner side in a vehicle width direction.

10. A vehicle comprising the anti-glare mirror according to claim 1 as a rear-view mirror.

11. A vehicle comprising the anti-glare mirror according to claim 1 as a side-view mirror.

12. The vehicle according to claim 11, wherein the cut portion is disposed at an end of the anti-glare mirror on an inner side in a vehicle width direction.

13. A method for manufacturing the anti-glare mirror according to claim 1, sequentially performing:
   forming the transparent electrode film on the back surface of the glass substrate;
   forming the electrochromic layer in the area excluding the portion that is covered with the anti-tack member covering a portion corresponding to the cut portion on the back surface of the transparent electrode film in the state that the anti-tack member is fixed to the glass substrate and the transparent electrode film;

forming a preformed film that can be the first and second electrode/reflecting films on the back surface of the electrochromic layer, a side surface of the electrochromic layer corresponding to the cut portion, and on the back surface of the transparent electrode film in the state that the anti-tack member is removed;

forming the cut portion by performing a laser-etching process on a portion of the preformed film that becomes outer edges of the cut portion, and isolating the preformed film into the first and second electrode/reflecting films; and electrically connecting the first terminal to the first electrode/reflecting film, and electrically connecting the second terminal to the second electrode/reflecting film.

* * * * *